March 23, 1937. R. D. AMSDEN 2,074,825
PHOTOMETRIC BATTERY TESTER
Filed Sept. 10, 1935 6 Sheets-Sheet 1

Fig.1.

Inventor:
Ralph D. Amsden,
by Harry E. Dunham
His Attorney.

March 23, 1937.  R. D. AMSDEN  2,074,825
PHOTOMETRIC BATTERY TESTER
Filed Sept. 10, 1935   6 Sheets-Sheet 3

Fig.3.

Inventor:
Ralph D. Amsden
by Harry E. Dunham
His Attorney.

March 23, 1937.    R. D. AMSDEN    2,074,825
PHOTOMETRIC BATTERY TESTER
Filed Sept. 10, 1935    6 Sheets-Sheet 6

Inventor:
Ralph D. Amsden,
by Harry E. Dunham
His Attorney.

Patented Mar. 23, 1937

2,074,825

UNITED STATES PATENT OFFICE 2,074,825

PHOTOMETRIC BATTERY TESTER

Ralph D. Amsden, Lynn, Mass., assignor to General Electric Company, a corporation of New York Application September 10, 1935, Serial No. 39,943

10 Claims. (Cl. 175—183)

My invention relates to photometric or measured-light-type devices for indicating the voltage or other electrical condition of electric apparatus, and particularly to such devices adapted to indicate the condition of electric batteries, for example, the usual three-cell storage batteries employed for the starting of automobile engines. The general object of the invention is to provide an improved photometric device of the above character which is of simple and low-cost construction, easily read, and giving a true indication by photometric means of the voltage of the individual battery cells.

It is a special object of the invention to provide a photometric or measured-light device, adapted to indicate, for example, the condition of battery cells, which constitutes a voltmeter having no moving parts, and which includes a photometric scale or scales which may be calibrated directly into volts.

In accordance with my invention, the foregoing objects, together with other objects which will appear hereinafter, are accomplished by providing a plurality of scales, for example one for each of the cells of a battery to be tested, each scale preferably comprising an opening, or a series of transverse openings or slots, covered or filled with translucent material and corresponding to voltage calibration indicia marked on the scale, the space behind each scale being divided longitudinally by a partition member spaced centrally of the scale. Illumination sources, such as electric lamps maintained at a predetermined standard degree of brightness and functioning as standard or comparison light sources, are mounted behind and at one end of each scale to illuminate that half of the scale which lies at one side of the centrally disposed partition member. At the opposite ends of the scales and on the opposite sides of the partition members from the above-mentioned standard lamps are mounted a corresponding set of illumination sources on lamps functioning as test light sources, each adapted to be connected to a corresponding cell of the battery to be tested, each of the test lamps illuminating the half of its corresponding scale on the side across the partition from the side illuminated by the corresponding standard or comparison lamp.

In each scale the illumination provided by the standard lamps for one side of the slots or openings is greatest at the scale end at which the standard lamp is mounted, the illumination gradually tapering off toward the scale end at which the test lamp is mounted. The illumination provided by the test lamps for the other side of the slots or openings is, however, greatest at the other end of the scales, at which the test lamps are mounted, and tapers off toward the end at which the lamps of standard brightness are mounted.

The device is initially calibrated by energizing all of the lamps at the same predetermined voltage. In order that under these conditions of equal calibration voltage the two halves of a predetermined one of the slots in each scale, for example, the slot corresponding to 1.8 volts, will be equally illuminated, the individual lamps of one or both sets of lamps are mounted movably with respect to the scales, thereby permitting compensation, for lamps which do not all give the same degree of illumination at the same voltage, by an adjustment of the two lamps illuminating a given scale closer to, or farther away, from each other.

After calibration of the instrument, the lamps of standard brightness are maintained at the initial predetermined voltage and the test lamps are arranged to be energized from the corresponding cells of the battery, the condition of which is to be tested either without load or under predetermined load conditions. The voltage of a given cell under test is then read directly from the corresponding scale, this voltage being visually indicated by the equal illumination of that one of the slots which corresponds to the voltage of the given cell.

In a modification of my invention, instead of illuminating the two halves respectively of a given scale by a standard light source and a test light source, the two halves are illuminated respectively by two light sources energized from two different circuits under test, for example, two cells of a battery to be tested. Two scales only are employed in the case of a usual three cell battery, the first and third cells, for example, illuminating the outer halves of the two scales and the other cell illuminating the inner halves of the two scales. In this modification, therefore, the scale illumination provided by a given cell is not compared with the scale illumination provided by a standard or comparison light source, but the device is utilized for the direct comparison of the condition of the cells. In order to provide a ready means for visually indicating whether the battery cells are entirely exhausted, or are near the state of complete exhaustion, a single standard or comparison light source may be provided which projects light upon a scale opening the illumination of which may be compared with the scale illumination provided by the cells of the battery under test.

My invention will be better understood from the following description when considered in connection with the accompanying drawings, and its scope will be pointed out in the appended claims.

Referring to the drawings.

In the present embodiment of the invention, illustrated in Figs. 1 to 6, I have provided a photometric instrument for testing electric apparatus which may comprise a panel or support member 10 on the rear of which is attached a scale unit 11 comprising a scale mounting member or box 12 open toward the panel, and extending rearwardly of the panel a substantial distance in order to shield the scales partially from outside light. In the rear wall 13 of scale box 12 three preferably vertically disposed scales 14 are provided, each comprising an opening, or a series of openings, or slots 15, formed in wall 13 or in a plate attached thereto, and filled or covered with translucent material, such as a sheet 16 (Fig. 4) of celluloid.

To illuminate the slots 15 from behind the scales and through the translucent material 16, three light sources or lamps 17, 18, 19 (Fig. 4) are arranged to project light along the back of the scales from one end, as the top, of box 12, and similarly three light sources or lamps 20, 21, 22 are arranged to project light along the back of the scales from the other end, or bottom of box 12, the lamps 17 to 22 being preferably mounted in a back plate or cover member 23 which may be removably conected to box 12 as by being slidably fitted therein.

Figure 1:
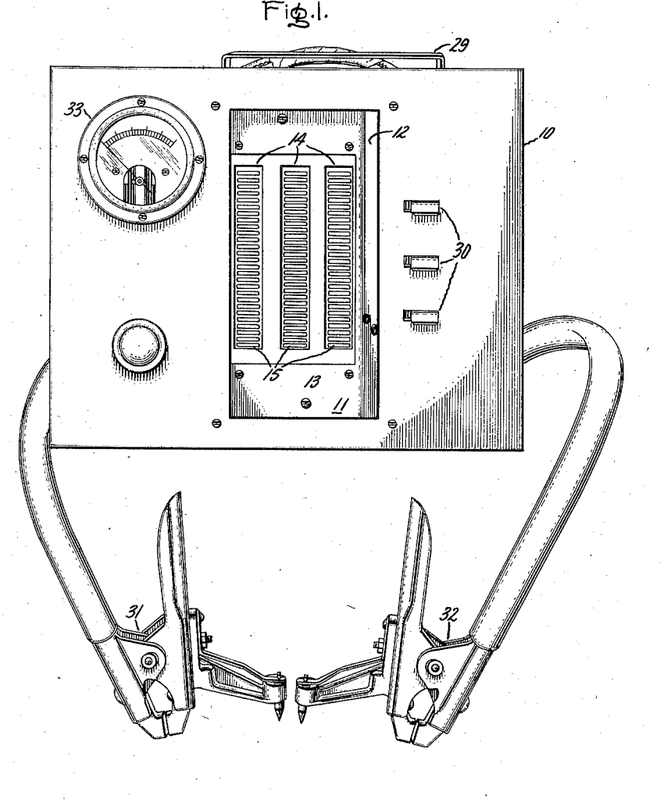
Fig. 1 is a front-elevational view of a battery-testing apparatus in which my invention has been embodied.
Figure 2:
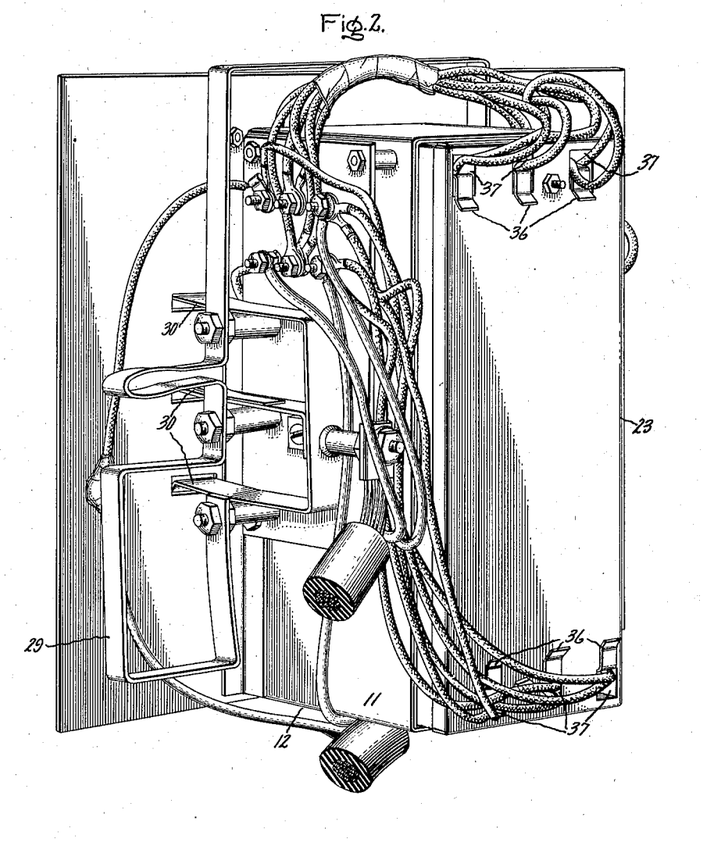
Fig. 2 is a rear view of the apparatus of Fig. 1, showing a box in which the scales and lamps are mounted, and further showing a battery load resistor and switch means therefor.
Figure 3:
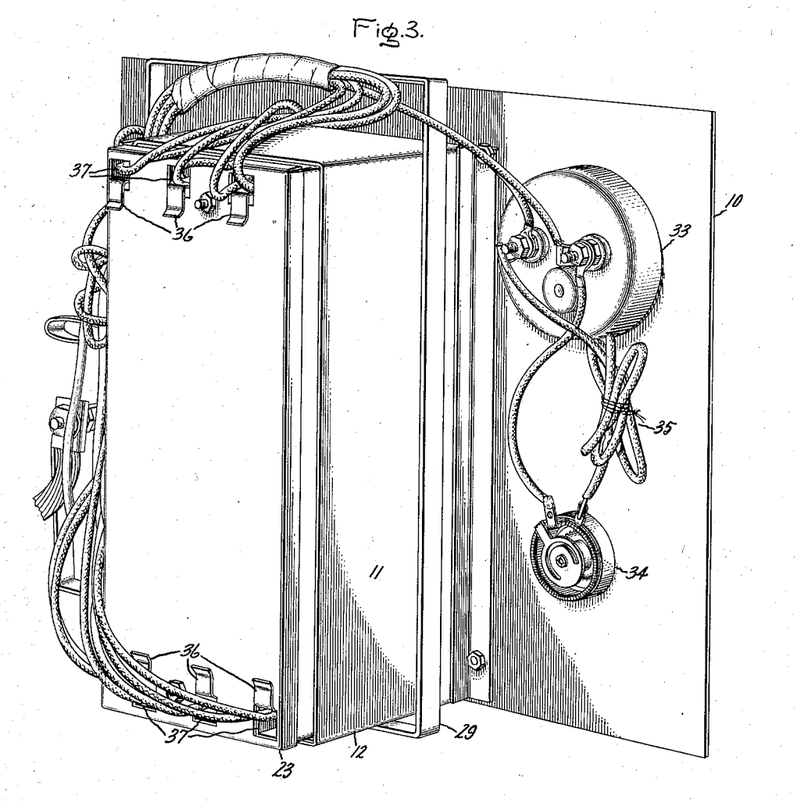
Fig. 3 is also a rear view of the apparatus of Fig. 1 but showing, in addition to the scale box, a voltmeter and rheostat for calibrating the instrument and for indicating and regulating the voltage of the standard lamps.
Figure 4:
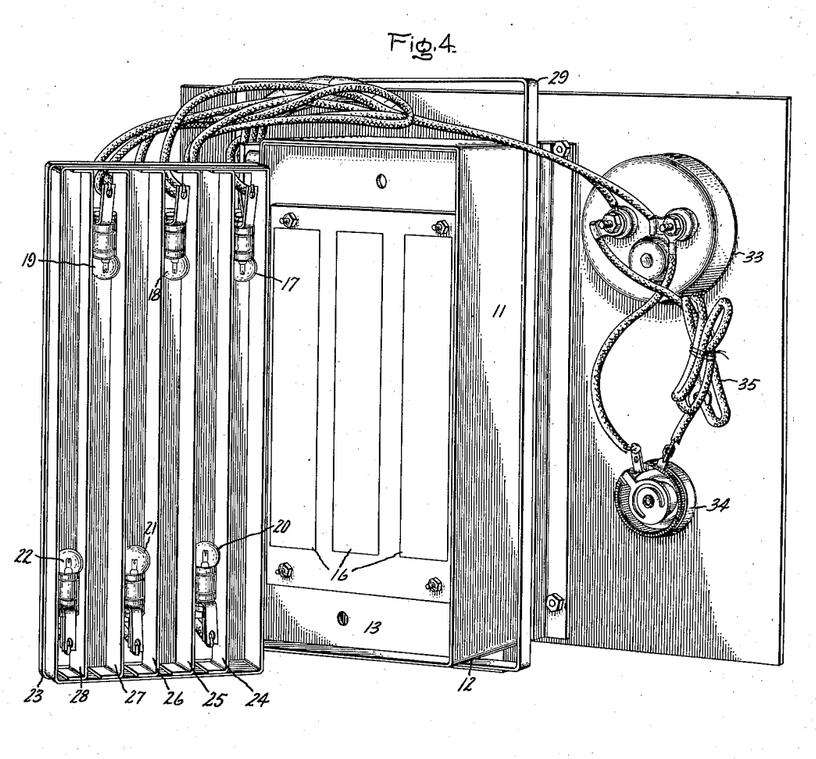
Fig. 4 is similar to Fig. 3, but with the back of the scale box removed to show the lamps, and the partitions behind the scales.

The space between the cover member 23 and the rear of the back plate 13 of scale box 12 is divided longitudinally by partition members 24 to 28 mounted on cover member 23. Partitions 25 and 27 separate the spaces behind the individual scales 14 from each other. Partitions 24, 26 and 28, however, are so disposed as to divide longitudinally the space behind each scale into halves, the latter partitions 24, 26, 28 extending for this purpose behind the center lines of the openings or slots 15. The standard or comparison lamps 17, 18, 19 are mounted respectively on the opposite sides of the partitions 24, 26, 28 from the test lamps 20, 21, 22 in order that one of the halves of each of the scales may be illuminated from one end, as the top of the scale, by the corresponding standard lamp and the other half from the other end, or bottom of the scale, by the corresponding test lamp.

Figure 5:
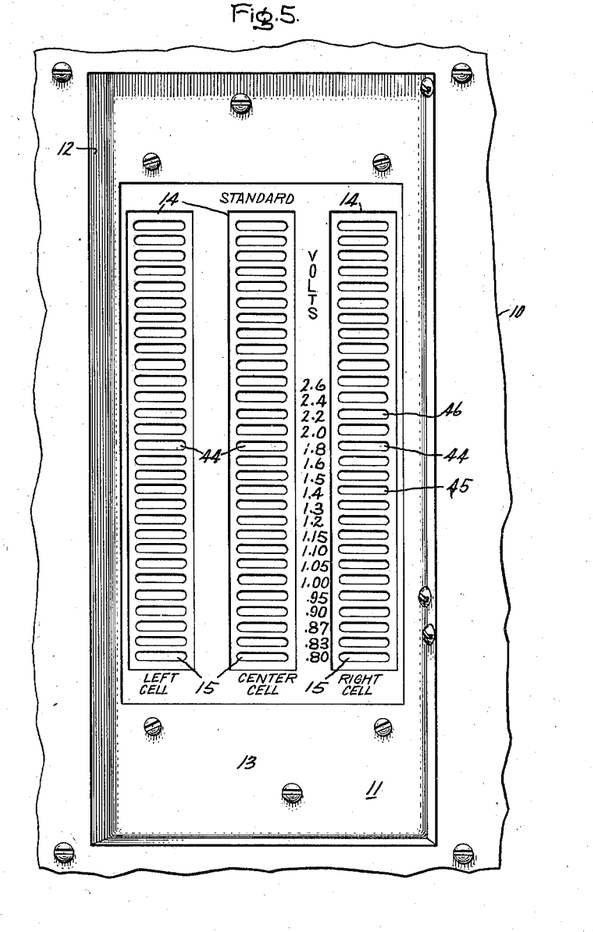
Fig. 5 is an enlarged view of the scale portion of the apparatus as shown in Fig. 1.

As shown in Fig. 5, the visible face of the scale unit 11 is preferably provided with voltage indicia. In case the instrument is to be used for indicating the condition of the usual automobile starting battery the calibration is preferably such that the 1.8 volt mark appears at or near the central point of the scales 14. It is further desirable, as shown in Fig. 5, to indicate at the top of the scale unit, by the designation "Standard", that the comparison lamps or lamps of standard brightness illuminate the scales 14 from the tops thereof, and to indicate at the bottom of the scale unit, by the designations "Left cell", "Center cell" and "Right cell", that the test lamps corresponding to these cells illuminate the scales from the bottom.

To provide the proper resistance load in series with the battery when the latter is to be tested under load conditions, a suitable resistor 29 (Figs. 2 and 6) is incorporated in the device, desired dischearge rates for different size batteries being provided for by switch arrangement including switches 30, whereby the amount of resistance appropriate to a given discharge rate is obtained by depressing one or the other of the switches.

To connect the instrument to a battery to be tested, battery clips of any preferred form, such as clips 31, 32 (Fig. 1) are provided which are adapted to make proper gripping contact with the battery terminals to carry the full test load current and also to make contact with the cells for the determination of individual cell voltage.

For the initial calibration of the instrument and for determining the proper voltage applied to the standard or comparison lamps 17, 18, 19, a voltmeter 33 and rheostat 34 are mounted on the instrument panel 10. Current for the initial calibration of the instrument and for the energizing of the standard lamps 17, 18, 19, during testing periods may be supplied through the leads 35 from any convenient source, such as dry cells, or the battery on test may be used.

In order to avoid the necessity of using only specially selected lamps, all giving exactly the same illumination when energized at the same voltage, I mount the lamps 17 to 22 movably with reference to the scales 14 which they illuminate. This is accomplished preferably by mounting the lamps on clips 36 (Fig. 3) extending through suitable slots 37 formed in back plate or cover member 23 of scale box 12, whereby the lamps are slidable longitudinally of the scale box to permit slight adjustment of the distance between the standard lamp and test lamp for each of the scales 14.

The initial calibration of the photometric instrument hereinabove described in detail in connection with Figs. 1 to 5 and the subsequent operation thereof as an instrument for indicating a condition of an electric circuit will be best understood by reference to the circuit diagram of Fig. 6, taken with Figs. 1 to 5.

For the calibration process, let it be assumed that the electric device to be tested, in the present example a three cell storage battery 38 (Fig. 6) of the automobile starting type, is initially not connected to the testing instrument. A current source, represented in Fig. 6 as a separate battery 39, is connected through the rheostat 34 and leads 40 to the standard or comparison lamps 17, 18, 19 arranged in parallel. The current source 39 is also connected, preferably through two sets of terminals 41 and 42, and leads 43, to the test lamps 20, 21, and 22 in parallel, it being understood that the terminals 41 are for this purpose temporarily connected together by a jumper or other suitable means and that the terminals 42 likewise are temporarily connected together. The voltmeter 33 is connected across the current supply circuit, and switches 30 are left open, the load resistor 29 being therefore not included in the calibration circuit connections.

Under these calibration circuit conditions all of the lamps, 17 to 22, are connected in parallel through rheostat 34 to the current source 39. The voltage applied to the lamps 17 to 22 is adjusted to a predetermined value, for example, 1.8 volts, and equal illumination across the lengths of those three slots, 44, corresponding to the 1.8 point on the voltage scale shown in Fig. 5 is obtained by adjusting, for each scale if necessary, the position of the corresponding standard and test lamps with reference to each other. Test lamps 20, 21, 22 are then disconnected from current source 39 by removing the connection means bridging terminals 41 and terminals 42.

After the above-described calibration of the instrument, a battery, as 38, the condition of which is to be determined, is connected in circuit with the test lamps 20, 21, 22, the connections being so arranged that the left-hand cell, for example, energizes test lamp 20, the center cell energizes lamp 21 and the right-hand cell energizes lamp 22. One of the switches 30 is operated to connect part or all of the load resistor 29 in series with the three cells of battery 38.

With these latter circuit connections the illumination, projected downwardly from the standard or comparison lamps 17, 18, 19, of one side of each of the scales 14 remains constant due to the constant voltage supplied to these lamps from source 39 through rheostat 34. But the illumination projected upwardly from the test lamps 20 to 22, of the other side of the scales varies in accordance with the voltage of the corresponding battery cells under test. If the voltage of a given cell under test, for example, the left-hand cell, stands at 1.8 volts, the two sides of the slot 44 corresponding to this voltage on the scale 14 will be equally illuminated, as above described in connection with the calibration process. If, however, the voltage of the given cell under test is lower than 1.8, for example, 1.4 volts, then the illumination projected upwardly from the corresponding test lamp will fall off to such a degree that equal illumination of both slot sides will be found to occur at a slot, as 45, between slot 44, corresponding to 1.8 volts, and the lower end of the scale, i. e., the end at which the test lamp is mounted. Likewise, if the condition of the given cell under test is such that the voltage of the cell is higher than 1.8 volts, for example, 2.2 volts, then both sides of a slot, as 46, corresponding to 2.2 volts on the scale and farther up from the test lamp than the slot 44, will be equally illuminated. The voltage of the individual cells of the battery under test is therefore indicated by the equal illumination, throughout their lengths from side to side of the scales, of those slots which correspond to the actual voltage of the cells as shown by the voltage indicia on the visible face of the scale unit 11.

In the use of the instrument for voltage testing purposes as above described, when the illuminated scales 14 are viewed from a distance of several feet, a visual effect akin to an optical illusion is observed, in that on each scale there appears to the eye to be a distinct diagonal shadow band and a diagonal light band, the two bands appearing to cross at that slot of the scale at which the illumination is equal on the two halves of the slot, this visual effect assisting the operator of the instrument materially in the ready determination of the condition of the battery cells under test.

To improve the appearance of the instrument when in use for the purpose of cell voltage indication and to facilitate the determination of cell condition, the light which is supplied by the lamps may, in addition to the function of illuminating the slots 15, be utilized to show colored areas on the scales. For example, vertically disposed slots at the test lamp side of the central and lower portions of a given scale may be covered or filled with translucent colored material. The lowermost of these vertical slots, which will be adjacent that part of the scale in which the voltage indicia show very low voltage or dead condition of the cell, may be colored red. The central vertical slot, adjacent that scale portion in which the voltage indicia indicate a discharged but not completely dead cell, may be amber colored. The uppermost vertical slot, which may extend for example between the 1.8 and the 2.6 volt positions indicating charged cell condition, may be colored green.

Preferably, however, the scale openings, such as the slots 15, which are utilized as hereinabove described for the precise determination of cell voltage by the method of equal illumination of the two sides of one of the slots, are themselves filled or covered with colored translucent material to show suitable colors in different parts of the scales. Those of the slots 15 which correspond to the voltage indicia 1.8 volts to 2.6 volts may be arranged to show green under illumination, those slots which are located at the extreme lower portion of the scale may be arranged to show red, and the intervening slots may be arranged to show any appropriate third color, the color for the slots being provided in any suitable manner, for example, by mounting colored translucent celluloid sheets behind the designated slots.

With the addition of the colored areas to the scales 14, the general condition of the different cells of the battery under test, whether in the charged, discharged, or dead zone, is apparent at a glance by noting the color indications together with the relative position of the crossed light and shadow bands hereinabove described, the exact voltage determination of the cells being then determined by noting, on the three scales, the position of those slots the two sides of which are equally illuminated.

Figures 6, 7:
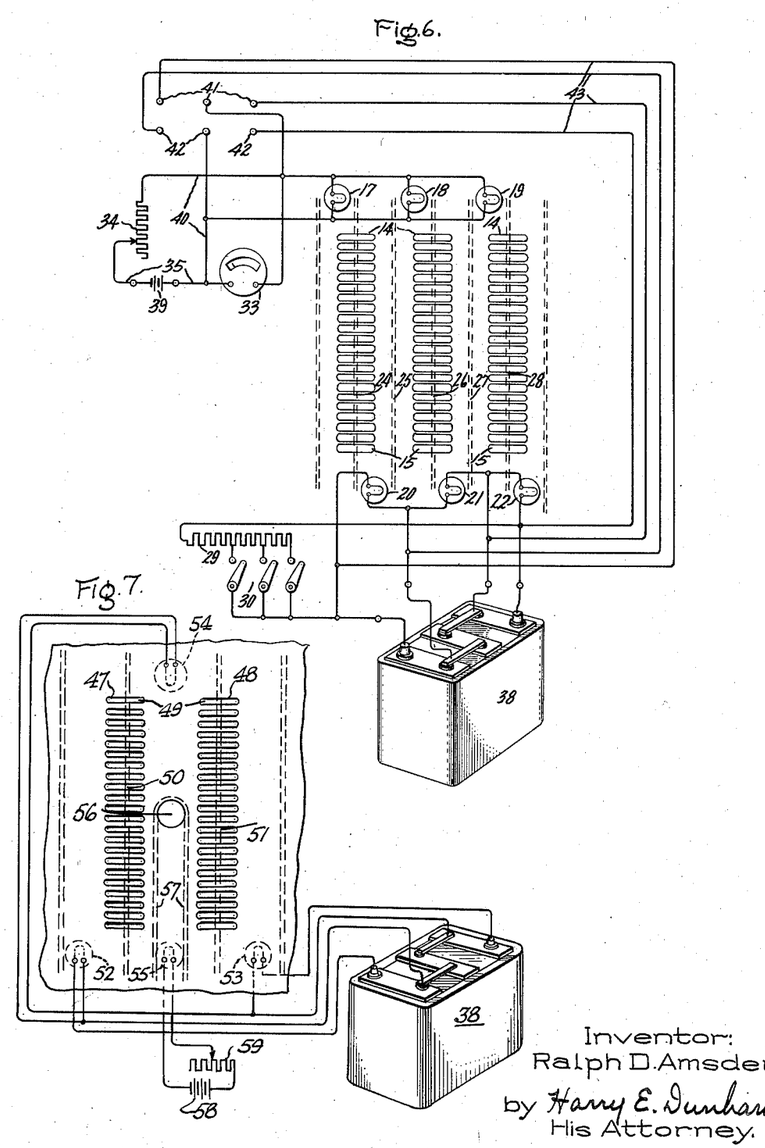
Fig. 6 is a circuit diagram for the apparatus shown in Figs. 1 to 5.
Fig. 7 is a semidiagrammatic representation of a portion of a photometric device, illustrating a modification of my invention.

Referring to the modification of my invention illustrated in Fig. 7, in this modification, for the testing of a three-cell battery 38, two scales only, 47 and 48, having openings or slots 49 filled with translucent material, corresponding to the scales 14 of Fig. 6, are provided. Partitions 50 and 51, corresponding to partitions 24, 26, and 28 of Fig. 6, extend behind the center lines of the slots 49 of the two scales. Test lamps 52 and 53, which are energized by two different cells, as the first and third, of battery 38 are mounted similarly to lamp 22 of Fig. 6. One of the test lamps, as 52, illuminates the outer half of one scale, 47, from one end thereof, as the lower end, and the other test lamp 53, illuminates the outer half of the other scale, 48, from the same end. The third test lamp 54, however, is mounted at the opposite end of the scales 47, 48 from test lamps 52 and 53, and is disposed between the center lines of the scales, to illuminate the inner halves of both scales.

A standard lamp 55 is so mounted as to illuminate a spot or area 56 located between and approximately half way up the scales 47, 48 and covered, preferably, with translucent material. The lamp 55 may be mounted at the opposite end of the scales 47, 48 from lamp 54 and the light from lamp 55 is prevented from striking the slots 49 by partitions 57. Lamp 55 is preferably supplied from a separate current source, as a battery 58 through a rheostat 59, and is maintained at an intensity of illumination corresponding to a predetermined standard or comparison voltage of the cells to be tested.

In operation of the photometric device illustrated in Fig. 7, since test lamp 52 energized from the first cell provides an illumination gradually tapering off from the bottom to the top of the left half of scale 50, and test lamp 54 energized from the second cell provides a similar illumination for the right half of scale 50 but tapering off from top to bottom of the scale, therefore the relative voltages of the two cells may be readily determined by noting the position, on scale 50, of that one of the slots 49 across which the illumination is uniform. If this point of uniform slot illumination occurs half way down the scale, the two cells are of equal voltage. If the point of uniform slot illumination on scale 50 occurs toward an end of the scale, the voltages of the two cells are unequal, the weaker cell corresponding to the lamp nearest which the point of uniform slot scale illumination occurs on the scale. In a similar manner the voltages of the second and third cells, corresponding to lamps 54 and 53, are compared. The determination of the near or complete exhaustion of any of the cells is facilitated by comparing the illumination of the scales 47, 48, provided by the test lamps 52, 53, 54, with the illumination of spot 56 by the standard lamp 55.

My invention has been described herein in particular embodiments for purposes of illustration. It is to be understood, however, that the invention is susceptible of various changes and modifications, and that by the appended claims I intend to cover any such modifications as fall within the true spirit and scope of my invention.

What I claim as new and desire to secure by Letters Patent of the United States is:

1. A photometric device for indicating an electrical condition of an electric apparatus comprising a scale, a source of light of constant intensity mounted at one end of said scale, light from said source being projected along a portion of said scale from one end of said scale toward the other end, and a light source the light from which varies in intensity in accordance with said electrical condition to be indicated mounted at the other end of said scale, light from said last-named source being projected from said other end of said scale along a portion of said scale adjacent and parallel to said first-named portion.

2. A photometric device for indicating an electrical condition of an electric apparatus comprising a scale, a source of light of constant intensity mounted behind and at one end of said scale to project light along a portion of said scale from said end toward the other end, a source of light varying in accordance with said electrical condition mounted behind and at the other end of said scale to project light along another portion of said scale from said other end thereof toward the first-named end, and means to prevent light from said first-named source from striking said second-named scale portion and to prevent light from said second-named source from striking said first-named scale portion.

3. A photometric device for indicating an electrical condition of an electric apparatus comprising a scale having formed therein substantially throughout its length a plurality of openings, translucent means to permit diffused light to traverse said openings, a partition dividing the space behind said scale longitudinally into substantially equal portions, a lamp providing constant illumination mounted behind said scale at one end thereof and at one side of said partition, and a second lamp providing illumination varying in accordance with said electrical condition mounted behind said scale at the other end thereof and at the other side of said partition.

4. A photometric device for indicating an electrical condition of an electric apparatus comprising a scale, a lamp providing a source of light of constant intensity mounted behind and at one end of said scale to project light along a portion of said scale from said end toward the other end, a lamp providing a source of light varying in accordance with said electrical condition mounted behind and at the other end of said scale to project light along another portion of said other end thereof toward the first-named end, and means to mount in said device one at least of said lamps movably with respect to said scale to vary the distance between said lamps.

5. A photometric device for indicating an electrical condition of an electric circuit comprising a scale having formed therein substantially throughout its length a plurality of openings, a partition disposed longitudinally of and behind said scale, a lamp providing constant illumination mounted behind said scale at one end thereof and at one side of said partition, a second lamp providing illumination varying in accordance with said electrical condition mounted behind said scale at the other end thereof and at the other side of said portion, and translucent material covering said openings, the material covering certain of said openings adjacent said other end of the scale being of a distinctive color and the material covering certain of said openings nearer the central portion of said scale being of another distinctive color.

6. In a photometric device for indicating the voltage of battery cells, a plurality of scales each for indicating the voltage of a different one of said cells, each of said scales having formed therein a plurality of transverse slots, translucent material covering said slots, partition means separating the space behind each scale from the space behind an adjacent scale, partition means dividing longitudinally the space behind each scale into two substantially equal spaces, and a plurality of pairs of lamps, each pair to illuminate the rear face of a different one of said scales, one of the lamps of each pair being of constant luminosity to provide a standard illumination for one side of the slots of the corresponding scale, the other lamp of each pair varying in luminosity in accordance with the voltage of the corresponding battery cell to provide a correspondingly varying illumination for the other side of the slots of the corresponding scale.

7. In a photometric device, a scale having formed therein substantially throughout its length a plurality of openings covered with translucent material, a lamp mounted behind and at one end of said scale to project light upon a portion of each of said openings, a second lamp mounted behind and at the other end of said scale to project light upon another portion of each of said openings, and a partition extending longitudinally of said scale to prevent light from said first-named lamp from striking said other portions of said openings and to prevent light from said second-named lamp from striking the first-named portions of said openings.

8. In a photometric device for comparing the voltage of battery cells or the like, two parallelly disposed scales having formed therein throughout their lengths a plurality of openings, partitions behind each of said scales extending longitudinally thereof and centrally of said openings, two lamps each mounted behind a different one of said scales at the same end thereof, each of said cells being energized from a different one of two of the cells the voltages of which are to be compared, said two lamps being mounted respectively at the outer sides of said partitions to illuminate the outer halves of said openings, and a third lamp mounted behind and at the other end of said scales and between said partitions to illuminate the inner halves of said openings, said third lamp being energized from another of the cells the voltages of which are to be compared.

9. In a photometric device for testing battery cells or the like, two parallel scales having formed therein a plurality of transverse openings, partitions behind each of said scales extending centrally of said openings, three lamps each energized from a different one of said cells, two of said lamps each being mounted outside said partitions and behind a different one of said scales and at the same end thereof to illuminate the outer half portions of said openings, the third lamp being mounted behind said scales at the other end thereof and between said partitions to illuminate the inner half portions of said openings, and means including a lamp of standard luminosity providing an illuminated area for comparison with areas of said openings illuminated by said three first-named lamps to determine the exhaustion or near-exhaustion of said cells.

10. A meter for indicating an electrical condition of an electric circuit comprising a scale having indicia marked thereon corresponding to changes in said electrical condition, and means operating to indicate visually said electrical condition on portions of said scale corresponding to said indicia, said means including a standard light source of fixed luminosity arranged to illuminate a portion of said scale from one end thereof, and a test light source energized from said circuit arranged to illuminate another portion of said scale from the other end thereof.

RALPH D. AMSDEN.